July 19, 1927.  
G. F. SHAVE  
1,636,079
REVERSIBLE STUMP JUMP DISK PLOW
Filed Feb. 25, 1925
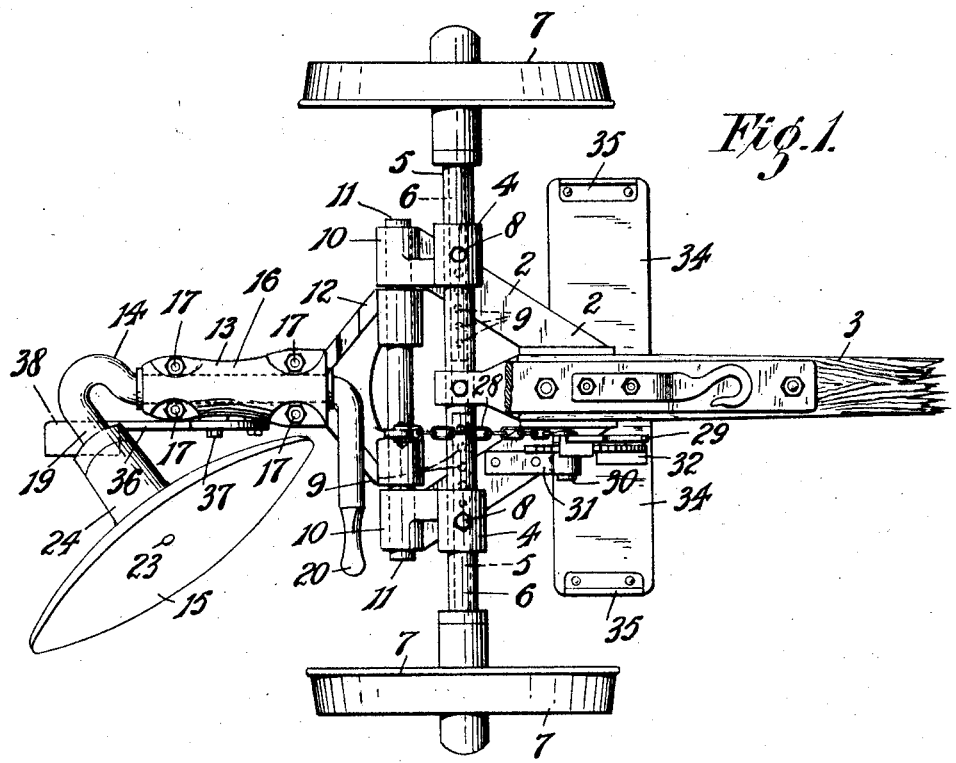
Inventor:  
G. F. SHAVE.

Patented July 19, 1927.

1,636,079

UNITED STATES PATENT OFFICE.

GEORGE FREDERICK SHAVE, OF LYNDHURST SOUTH, VICTORIA, AUSTRALIA.

REVERSIBLE STUMP-JUMP DISK PLOW.

Application filed February 25, 1925, Serial No. 11,544, and in Australia May 8, 1924.

This invention relates to improvements in and relating to stump-jump disk plows, and it has been devised to provide a disk plow of light draught and durable construction having, amongst other objects, improved stump-jump mechanism which will be very effective in operation.

Further objects are to provide improved means for reversing the disk or disks of the implement and maintaining the same in selected position, means permitting transverse adjustment of the land wheels relatively to the disk or disks to thus regulate the width of furrow, and adjusting means associated with the stump-jump arm or arms to regulate the depth of furrow.

With these and other objects in view, the invention consists of the features of construction, combination and arrangement hereinafter described, reference being had to the accompanying drawings, wherein:—

Figure 1 is a view in plan of a reversible stump-jump disk plow according to the invention.

Figure 2 is a sectional side elevation of Figure 1, the disk being shown in broken lines for convenience of illustration.

The implement frame 2 is designed to be of light draught and durable construction, and has rigidly secured thereto a draught pole 3. The frame is provided with a pair of upstanding apertured bosses 4 wherein is stationarily fitted a tubular axle 5.

Telescopically slidable in the opposite ends of said tubular axle are stub axles 6, each of which revolvably supports a land wheel 7. These stub axles are capable of being adjusted longitudinally within the tubular axle 5, and they are locked in required positions therein by set-screws 8 passed through said bosses 4 and engaging selected holes 9, a series of which is formed in each of said stub axles to provide for a variety of adjustments in spacing apart the land wheels 7.

Bosses 10 are also formed on the implement frame and support a horizontal spindle 11 rearwardly of said tubular axle 5. Pivotally mounted on the spindle 11 is a stump-jump arm 12 having a relatively long bearing 13, in which is rotatably fitted a stem or shaft 14 carrying a disk 15. A cap 16 is fitted to the bearing 13 by bolts 17, and its detachment permits the single disk stem or shaft to be conveniently removed, as and when required.

The disk stem or shaft 14 illustrated in Figure 1 has its rear end bent into substantially U-shape to provide a stub axle 19 for the disk, and its forward end is bent at approximately right angles and is fashioned as a hand-lever 20 by means of which the disk 15 can be readily reversed on a horizontal axis.

An upwardly extending arm 27 is formed on or is secured to the stump-jump arm 12, and attached to the upper end of said arm 27 is a chain 28 having its forward end attached to a hand-lever 29. This hand-lever is pivotally mounted on a pin 30 fitted in a bracket 31 that is secured to the plow frame 2, and it is furnished with a trigger lever or a catch of ordinary type to engage with the notches of a quadrant 32. By advancing the pivoted hand-lever, the stump-jump arm 12 is swung upwardly on the spindle 11 and raises the disks 15, which may be elevated above the ground level when required.

In lieu of the chain 28, I may provide a metal rod or a powerful spring, which upon retraction of the hand-lever 29 will enable sufficient downward pressure to be exerted on the stump-jump arm such as may be necessary to maintain the disk or disks in hard ground being cultivated.

The plow has a seat 33 which may be of ordinary type and a foot-rest 34 which is secured to the plow frame 2 is provided on its upper surface with end stops 35 of angle-section metal.

The adjustment of the land-wheels 7 transversely of the implement by the means herein described provides for the conversion of the implement from a single disk to a double disk plow or vice versa, and furthermore, such adjustment relatively to the disk or disks controls the width of furrow. To regulate the depth of furrow, a skid 36 is pivotally mounted upon a bolt or pin 37 secured to the bearing 13 of the stump-jump arm 12. This skid is constructed having a foot-piece 38 adapted to ride upon the surface of the ground and thus limit the cutting depth of the disk or disks. At the upper end of said skid, there is formed a curved member 39 having a series of adjustment holes 40 to receive a locking stud 41—see Figure 2. By removing the locking stud, the skid can be swung on the pivot bolt or pin 37 to elevate its foot-piece 38 to required height, when said skid is again locked in operative position by inserting the stud into a convenient adjustment.

What I do claim is:—

A stump-jump disk plow comprising a V-shaped frame, bosses on said frame, a horizontal spindle carried in said bosses, a stump-jump arm pivotally mounted on said spindle between said bosses, a long bearing on said arm, a stem rotatably mounted in said bearing, an axle member at one end of said stem, a cutting disk on said axle member, a handle at the other end of said stem for reversing said disk, an adjustable skid carried by the rear end of the stump-jump arm, a hand lever on the frame, an extension on the stump-jump arm and a connection between said extension and said hand lever for raising and lowering the cutting disk.

In testimony whereof I affix my signature.

GEORGE F. SHAVE.